United States Patent [19]
Amereller et al.

[11] Patent Number: 5,509,061
[45] Date of Patent: Apr. 16, 1996

[54] METHOD FOR STORING MESSAGES IN NETWORKED MESSAGE MEMORY UNITS

[75] Inventors: Walter Amereller; Mehmet Ersue, both of Munich; Franz Liebl, Moosburg; Gerald Maurer, Munich, all of Germany

[73] Assignee: Siemens Aktiengesellschaft, Munich, Germany

[21] Appl. No.: 242,232

[22] Filed: May 13, 1994

[30] Foreign Application Priority Data

May 28, 1993 [DE] Germany .......................... 43 17 894.4

[51] Int. Cl.⁶ .......................... H04M 3/50; H04Q 11/04
[52] U.S. Cl. .......................... 379/207; 379/89; 379/225; 370/61
[58] Field of Search ........................ 370/61; 379/67, 379/88, 89, 207, 225, 269

[56] References Cited

U.S. PATENT DOCUMENTS

| | | | |
|---|---|---|---|
| 4,694,452 | 9/1987 | Beckinger et al. | 370/58.2 |
| 4,903,258 | 2/1990 | Kuhlmann et al. | 370/58.2 |
| 5,018,097 | 5/1991 | Kuhlmann et al. | 395/700 |
| 5,047,923 | 9/1991 | Elstner et al. | 395/600 |
| 5,113,430 | 5/1992 | Richardson, Jr. et al. | 379/88 |
| 5,274,696 | 12/1993 | Perelman | 379/89 |

FOREIGN PATENT DOCUMENTS

| | | |
|---|---|---|
| 3732832 | 4/1989 | Germany . |
| 3724847 | 4/1992 | Germany . |

OTHER PUBLICATIONS

Patent Abstracts of Japan, unexamined applications, E Field, vol. 9, No. 315, dated Dec. 11, 1985: JP-A-60-148 226 (Fujitsu).
Patent Abstracts of Japan, unexamined applications, E Field, vol. 16, No. 312, dated Jul. 9, 1992: JP-A-04-87 448 (NEC).
Siemens AG "HICOM 600 System Product Data", Order No. A19100-K 3161-G430-01-7600 (p. 19): published Jan. 1985.
Siemens Magazine COM., "ISDN in the Office HICOM", Special issue of Telcom Report, Dec. 1985, pp. 56-64 and 73-80; ISBM 3-8009-3849-9.
"Das Personenbezogene Mitteilungs-Übermittlungssystem der DBP", F. Krömer, TELEBOX, 41/1988 No. 2, pp. 67-83.

*Primary Examiner*—Thomas W. Brown
*Attorney, Agent, or Firm*—Hill, Steadman & Simpson

[57] ABSTRACT

Messages that cannot be delivered into the mailbox of the message addressee in networked message memory units (for example, given malfunctions) are transmitted back into the mailbox of the message sender after a predetermined time. Each message is provided with message-associated information (for example, name of the message sender, time at which the message was generated). In order to avoid the same message from being repeatedly stored in the memory unit of the message sender given multiaddress transmission of one of the same message to a plurality of message addressees and given non-deliverability of the messages, the message-associated information of fed back messages are checked for identity and are not stored if identified.

4 Claims, 2 Drawing Sheets

METHOD FOR STORING MESSAGES IN NETWORKED MESSAGE MEMORY UNITS

BACKGROUND OF THE INVENTION

Various telephone private branch exchanges are known that, in addition to having the capability for the actual exchange control, also have the capability for a control or realization of additional control procedures that proceed beyond the actual switching procedure. Such additional functions are generally referred to as performance features, and a great number of different performance features is thereby known, particularly for "voice" communication service. Included among such performance features are the storing of voice messages in what are referred to as mailboxes that are allocated to intended addressees.

A computer-controlled telephone private branch exchange having such mailboxes is already known from the product publications of Siemens AG "HICOM 600 System Product Data", Order No. A19100-K 3161-G430-01-7600 (page 19) and from "ISDN in the Office", Special Issue of Telcom Report and Siemens Magazin COM, pages 56 through 64 and 73-80, ISBM 3-8009-3849-9.

German Published Application DE 37 32 832 A1 already discloses a method and an arrangement for storing telephone messages. Provided among other things in the known method is that messages deposited in the memory of a message addressee are fed back into the memory of the message sender when the message addressee does not fetch the message before a specific point in time.

SUMMARY OF THE INVENTION

It is an object of the present invention to provide a method of the type initially cited that enables a delivery of the same message to a plurality of message addressees, This object is inventively achieved by a method of the present invention for storing messages in networked message memory units, wherein each message memory unit has at least one addressee-associated message memory. Each message sender has an allocated message memory. Collaborating controllers are allocated to the message memory units and to the message memories allocated to the message senders. Messages generated by a message sender can be respectively transmitted to a plurality of addressee-associated message memories. Intermediate memories for the intermediate storage of addressee-associated messages are allocated to the message memory units. The controllers have a control program allocated to them that is fashioned in such a way that messages are provided with a message-associated information when they are generated. After being generated, addressee-associated messages are deposited in the intermediate memories of the message memory unit allocated to the addressee-individual message memory. Addressee-associated messages that are not transmitted within a prescribable time from an intermediate memory into the appertaining, addressee-associated message memory are fed back into the message memory allocated to the message sender. The controller allocated to the message memory of the message sender checks message-associated information of incoming messages for identity and the incoming message is not stored in the message memory of the message sender insofar as the identity of a message-associated information of an incoming message with a message-associated information of a message already received is recognized.

An important feature of the present invention is that messages not fetched by a message addressee do not use up the capacity of the allocated memory beyond a predetermined time. The sender of a message that is not fetched is informed that the message has not been fetched without having messages that are fed back to the memory of the message sender burdening this memory. This advantage particularly derives when a message is transmitted to a plurality of addressees and the message is not fetched by a number of addressees.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
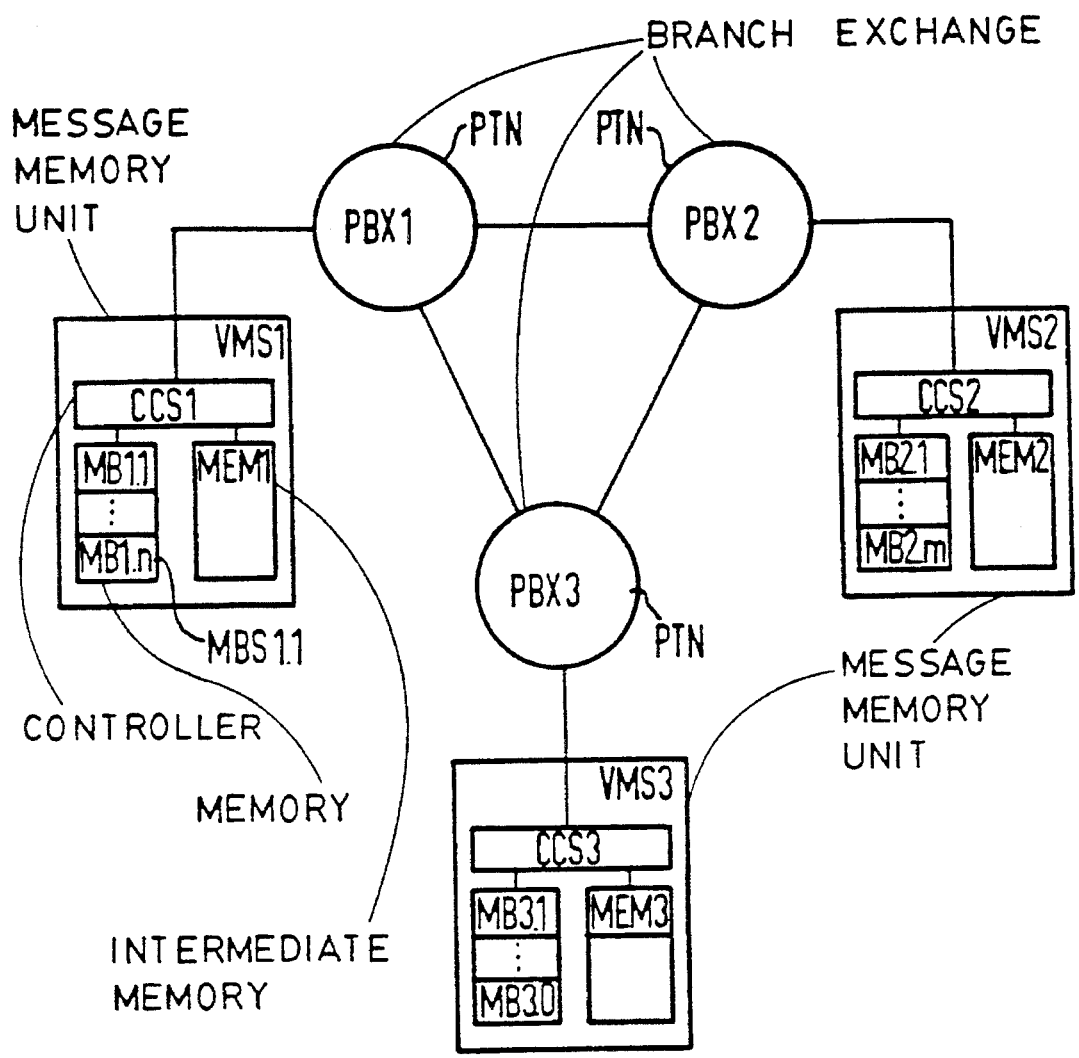
FIG. 1 depicts networked telecommunication private branch exchanges having message memory units into which messages can be written in conformity with the method of the present invention.

FIG. 1 shows a network having three telecommunication private branch exchanges PBX1, PBX2 and PBX3. Each of these private branch exchanges, for example, can be fashioned like the private branch exchange set forth with reference to FIG. 2. These can be incorporated into public networks PTN as well as into private networks having complex structures.

Every private branch exchange PBX1, PBX2, PBX3 shown in FIG. 1 is connected to a message memory unit VMS1, VMS2 or, respectively, VMS3. Such a message memory unit comprises a controller CCS1, CCS2, CCS3, at least one memory (MB1.1, . . . MB1.n; MB2.1, . . . MB2.m; MB3.1, . . . MB3.o) individually associated to a message addressee, and potentially at least one intermediate memory (MEM1, MEM2, MEM3). Addressee-associated messages, for example, are first intermediately stored in the intermediate memory within the framework of the method of the present invention and are transmitted from the intermediate memories to the appertaining addressee-associated message memory. Alternatively thereto, addressee-associated messages can also be directly written into the respective addressee-associated message memory, that is, without intermediate storage.

In the arrangement shown in FIG. 1, a message memory MBS1.1 is allocated to a message sender. This message memory MBS1.1 of the message sender in the exemplary embodiment shown in FIG. 1 simultaneously serves for the acceptance of addressee-associated messages and is therefore also referenced with reference character MB1.n. This memory MBS1.1 or, respectively, MB1.n is thus allocated to exactly one subscriber who can both send a message as well as receive messages.

Figure 2:
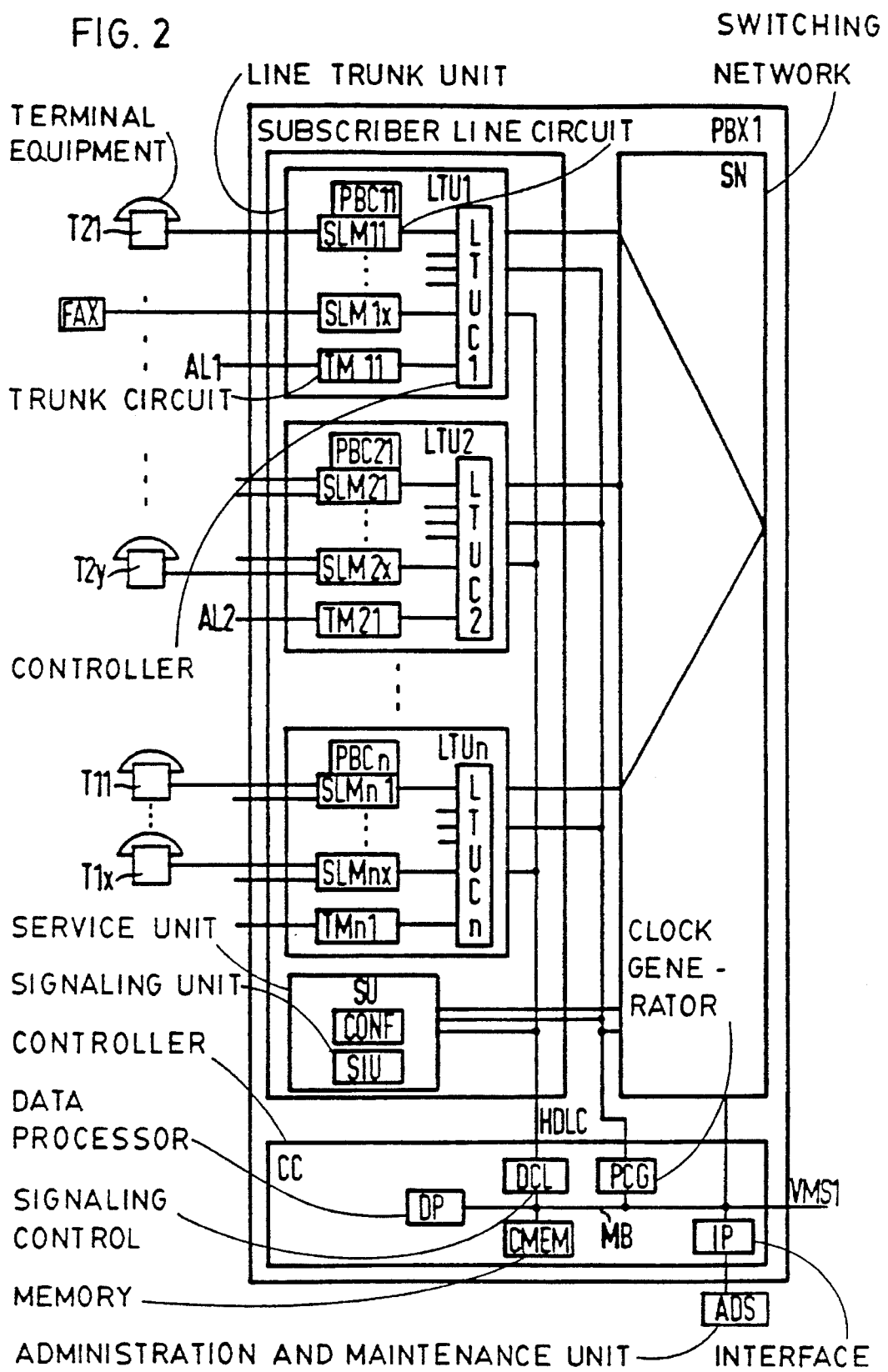
FIG. 2 depicts a telecommunication private branch exchange of FIG. 1.

The telecommunication private branch exchange shown in FIG. 2 can be structured like the private branch exchange disclosed in the initially cited product publications or can be structured like the telecommunication switching system that is disclosed in the published European Patent Applications EP 0 306 693 A1 (U.S. Pat. No. 4,903,258 hereby incorporated by reference), EP 0 303 870 A2 (U.S. Pat. No. 5,018,097 hereby incorporated by reference) and EP 0 303 869 A1 (U.S. Pat. No. 5,047,923 hereby incorporated by reference). The software architecture of the known system is based on the following criteria: the first architecture criterion is directed to the tripartite division of the switching software into the function complexes of peripheral processing, device handler and call processing. The peripheral processing thereby handles the transport function and runs essentially on the line/trunk modules for the terminal equipment and lines. The device handler has the job of matching the interface to the peripheral processing to the ISDN interfaces to the call processing. The call processing undertakes the actual performances for the user surfaces of the terminal equipment or, respectively, for the interfaces to the various sets.

The second architecture criterion represents the state or, respectively, event processing in the call processing CP that are oriented to services and terminal equipment. The service criterion is offered as ISDN protocol element of the control software that identifies the apparatus type service-associated on the basis of the co-supplied device address.

The third architecture criterion for simple handling of the multitude of terminal equipment and services is comprised in the strict application of the dedicated database which the programs fundamentally access only on the logical level.

The system shown in FIG. 2 is composed of a system center PBX1 having a controller CC that is connectable to what are referred to as peripheral modules and to a switching network SN. The peripheral modules particularly comprise subscriber line circuits SLM11 . . . SLM1X, SLM21 . . . SLM2X, SLMn2 . . . SLMnX as well as what are referred to as trunk circuit TM11, TM21 and TMn1.

The subscriber line circuits SLM are subscriber-oriented device attachments such as, for example, ISDN base terminals or accesses for digital mono-functional and multi-functional terminal equipment, one-channel connection modules for terminal equipment such as digital voice terminal equipment and an exchange terminal equipment as well as subscriber line terminals for analog voice terminal equipment. The terminal equipment T11, T1X, T21, T2y shown in FIG. 2 are preferably digital voice terminal equipment with which voice messages can be input into message memory units VMS1; VMS2; VMS3 (FIG. 1) and with which voice messages can be fetched from a memory MBS1.1 (FIG. 1) allocated to the respective subscriber or terminal equipment. A fax machine FAX serves the purpose of depositing fax messages in corresponding memories or, respectively, of fetching fax messages from corresponding memories.

The trunk circuits TM11, TM21, TMn1 serve for the connection of public and/or private networks or of special equipment. For example, they are ISDN basic accesses for ISDN inter-exchange traffic (exchange lines AL1, AL2, ALn) and ISDN interconnection traffic (two channels of 64 kbit/s each and ISDN signaling), as well as digital interface units, i.e. multiplex terminals (30 channels of 64 kbit/s each) having the operating modes of inter-exchange and interconnection traffic with ISDN signaling, interconnection traffic with channel-associated signaling.

All periphery modules SLM11 . . . , TM11 . . . have the same intra-system interfaces. They couple the individual B-channels B on which useful data, i.e. voice and/or data information are transmitted, to an arbitrary selection of two multiplex channels (highways) having, for example, 32 channels of the switching network SN and forward the signaling information transmitted in a control channel D to the controller CC1 as HDLC protocol. Each periphery module comprises a controller PBC11 . . . whose function it is to allocate occupied access channels to selected channels of the multiplex channels, potentially with a controller LTUC1 . . . of an appertaining line trunk unit LTU1 . . . (European Patents 0 113 884 and 0 264 890, and U.S. Pat. No. 4,694,452 hereby incorporated by reference).

A plurality of periphery modules can be functionally combined to form a line trunk unit LTU. Every line trunk unit LTU1 . . . LTUn has a controller LTUC1 . . . LTUCn allocated to it. The line trunk units are connected to one another with the switching network SN via, for example, four voice/data multiplex channels. The message exchange between the periphery modules and the controller CC ensues via a signaling channel (which is referenced HDLC in FIG. 2) in the known HDLC point-to-multipoint method.

A plurality of line trunk units LTU1 . . . LTUn can have what is referred to as service unit SU allocated to them. This comprises a signaling unit SIU and, potentially, a conference means CONF. The signaling unit SIU assumes the character supply of the system with call progress tones and, potentially, with announcements and also assumes the reception of MFV clock pulse selection characters and exchange dial tones. This function is realized in a known way with signal processors.

The signaling unit SIU is connected to the switching network SN via two voice/data multiplex channels given a fixed function allocation.

The switching network SN is preferably modularly constructed and is composed, for example, of a non-blocking time stage for 16 voice/data multiplex channels. A switching stage for 1024 time slots (32 multiplex channels of 32 channels each) arises by interconnecting two such basic modules. Of the respectively 32 incoming and outgoing multiplex channels for voice or data, the non-blocking time stage formed in this way respectively connects two arbitrary time slots of the 32 time slots to one another. Broadband connections can also be set up in addition to one-channel connections.

In cooperation with the controllers PCB11 . . . , LTUC1 . . . , the controller CC assumes the switching-oriented processing arising according to the periphery structure. It is composed of a data processor DP, a processor for signaling control DCL, a clock generator PCG, a memory CMEM and an interface IP that is connected to an administration and maintenance unit ADS. The memory CMEM contains a data base with configuration data which include the allocation of the terminal equipment T11 . . . T1x, T21 . . . T2y to subscriber-associated message memories (FIG. 1, MB1.1, . . . ; MBS1). These components are connected to one another and to a message memory unit VMS1 that, in particular, is fashioned as an integrated server (Siemens AG, "ISDN in the Office", pages 73 through 80) via a multibus MB, as shown in FIG. 2.

Processors of the series SAB 80286/80386/80486 (Intel) are preferably employed for the data processor DP. The program allocated to the controller CC and which defines the method of the present invention is deposited in the memory CMEM. The memory CMEM contains LSI, dynamic RAM modules and error-correcting circuits. The processor DCL for signaling control serves for the sequencing of the HDLC protocol to the line trunk units LTU1 . . . LTUn and the service unit SU. The clock generator PCG implements the clock supply of the telecommunications private branch exchange.

It is assumed below that a message sender to whom a memory MBS1 is allocated generates a message intended for a message addressee. The control program allocated to the controller CCS1 is thereby fashioned in such a way that messages are provided with a message-associated information when they are generated. For example, this information comprises an identification of the message memory (for example, MBS1.1) that is allocated to the sender of the message, as well as a time of day/date stamp. This message-associated information is transmitted to the respective message memory unit (for example, VMS2, FIG. 1) together with the actual message. There, it is directly written into the respective addressee-associated memory of the addressee (for example, MB2.1, FIG. 1) or, alternatively thereto, is written into the intermediate memory MEM2. The same message can be written into a plurality of corresponding message memories for different message addressees, for example, into the message memories MBi.n (VMS1), MB2.1, . . . MB2.m (VMS2) and MB3.1 (VMS3).

The messages can be generated with any desired terminal equipment. When the sender enters the message into the terminal equipment (for example, T11) allocated to him, the controller CC forms the message-associated information on the basis of a configuration datum (allocation of terminal equipment T11—memory MBS1.1) on its own. When the sender inputs the message at an arbitrary terminal equipment not allocated to him (for example, in a "foreign" private branch exchange PBX2), then he must additionally input a message that identifies his message memory MBS1.1, for example with a chip card that is read with a reader means of the respective terminal equipment. The sender can also input the message into his memory MBSi.1 from an arbitrary terminal equipment together with addressee-associated information and together with a command that triggers the corresponding transmission.

The program allocated to the message memory control unit (for example, CCS1 in VMS1) is fashioned in such a way that an addressee-associated message is first deposited in that intermediate memory (for example, MEM1) that is allocated to the message memory unit (for example, VMS1) whose controller (CCS1) administers the respective addressee-individual message memory. The message transmitted to the message memory unit (for example, VMS2) is checked for transmission from the intermediate memory (MEM2) into the addressee-associated memory (for example, MB2.1). When the message is not transmitted from the intermediate memory (MEM2) into the addressee-associated memory (MB2.1) within a predetermined time, for example because of a malfunction or due to the lack of free memory capacity, the message memory control unit CCS2 initiates the return transmission or feedback of the message as well as of the message-associated information to the memory MBS1 (in VMS1) that is allocated to the message sender. The controller CCS1 allocated to this memory MBS1 checks the message-associated information of returned or fed back messages for identity. When identity is not recognized, the appertaining message is deposited in the memory MBS1. When identity is recognized, by contrast, storing the message in the memory MBS1 is not carried out. In this case, only the storing of the message-associated information or of information derived therefrom is provided with which the message sender is informed about the return transmission or feedback of the message identified by this information.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for storing messages in networked message memory units, comprising the steps of:

providing in each of the message memory units a subscriber-associated message memory having addressee-associated memories, the subscriber-associated memory being allocated to a message sender;

providing in each of the message memory units a collaborating controller operatively connected to the subscriber-associated message memory, messages generated by the message sender of a respective memory unit being transmitted to a plurality of addressee-associated message memories of other memory units;

providing in each of the message memory units an intermediate memory for intermediate storage of addressee-associated messages;

providing in each of the controllers a control program that generates addressee-associated messages having message-associated information;

storing a generated addressee-associated message in the intermediate memory of a first message memory unit;

feeding back into the addressee-associated message memory allocated to the message sender an addressee-associated message that is not transmitted within a predetermined time from an intermediate memory of a second message memory unit to an appertaining addressee-associated message memory in the second message unit;

checking via the controller in the first message memory unit for identity of message-associated information for incoming addressee-associated messages, so that the incoming addressee-associated messages are not being stored in the addressee-associated message memory of the first message memory unit when the message-associated information of an addressee-associated incoming message is identical to message-associated information of an addressee-associated message already received by the first message memory unit.

2. The method according to claim 1, wherein the controller of the addressee-associated message memory of the first message memory unit stores information indicating feedback of an addressee-associated message in the addressee-associated message memory of the first message memory unit when there is identity of message-associated information of received addressee-associated messages.

3. A circuit arrangement for storing messages in networked message memory units, comprising:

each of the message memory units having a subscriber-associated message memory having addressee-associated memories, the subscriber-associated memory being allocated to a message sender;

each of the message memory units having a collaborating controller operatively connected to the subscriber-associated message memory, messages generated by the message sender of a respective memory unit being transmitted to a plurality of addressee-associated message memories of other memory units;

each of the message memory units having an intermediate memory for intermediate storage of addressee-associated messages;

each of the controllers having a control program that generates addressee-associated messages having message-associated information;

means for storing a generated addressee-associated message in the intermediate memory of a first message memory unit;

means for feeding back into the addressee-associated message memory allocated to the message sender an addressee-associated message that is not transmitted within a predetermined time from an intermediate memory of a second message memory unit to an appertaining addressee-associated message memory in the second message unit;

means for checking via the controller in the first message memory unit for identity of message-associated information for incoming addressee-associated messages, so that the incoming addressee-associated messages are not being stored in the addressee-associated message memory of the first message memory unit when the message-associated information of an addressee-associated incoming message is identical to message-associated information of an addressee-associated message already received by the first message memory unit.

4. A method for storing messages in networked message memory units, comprising the steps of:

providing in each of the message memory units a subscriber-associated message memory having addressee-associated memories, the subscriber-associated memory being allocated to a message sender;

providing in each of the message memory units a collaborating controller operatively connected to the subscriber-associated message memory, messages generated by the message sender of a respective memory unit being transmitted to a plurality of addressee-associated message memories of other memory units;

providing in each of the message memory units an intermediate memory for intermediate storage of addressee-associated messages;

providing in each of the controllers a control program that generates addressee-associated messages having message-associated information;

storing a generated addressee-associated message in the intermediate memory of a first message memory unit;

feeding back into the addressee-associated message memory allocated to the message sender an addressee-associated message that is not transmitted within a predetermined time from an intermediate memory of a second message memory unit to an appertaining addressee-associated message memory in the second message unit;

checking via the controller in the first message memory unit for identity of message-associated information for incoming addressee-associated messages, so that the incoming addressee-associated messages are not being stored in the addressee-associated message memory of the first message memory unit when the message-associated information of an addressee-associated incoming message is identical to message-associated information of an addressee-associated message already received by the first message memory unit, and storing information indicating feedback of an addressee-associated message in the addressee-associated message memory of the first message memory unit when there is identity of message-associated information of received addressee-associated messages.

\* \* \* \* \*